Patented Dec. 9, 1941

2,265,548

UNITED STATES PATENT OFFICE 2,265,548

PROCESS FOR THE PRODUCTION OF ISOBUTANE

George Cornelis Adriaan Schuit, Amsterdam, Netherlands, assignor to Shell Development Company, San Francisco, Calif., a corporation of Delaware No Drawing. Application July 15, 1939, Serial No. 284,753. In the Netherlands August 9, 1938

8 Claims. (Cl. 260—676)

The present invention relates to a process for the production of isobutane by the catalytic isomerization of normal butane.

As is well known, there are two hydrocarbons of the formula $C_4H_{10}$, the straight chain compound, normal butane, and the forked chain compound, isobutane. While normal butane is a relatively abundant naturally occurring material, isobutane occurs naturally only to a limited extent and is obtained chiefly from gaseous by-products from hydrocarbon cracking processes. Furthermore, while normal butane is chemically quite inert and finds relatively little application except as a fuel gas, the branched chain isomer is chemically more reactive and is readily converted into a wide variety of useful and valuable products. For example, isobutane is readily alkylated with olefinic hydrocarbons to form valuable saturated hydrocarbons of excellent antiknock properties; it can, likewise, be readily dehydrogenated to form isobutylene which, in turn, may be polymerized and hydrogenated to produce iso-octane or used as a starting material for the syntheses of a wide variety of valuable products. In view of the abundance of normal butane and the ever increasing demand for isobutane, the present process which enables isobutane to be economically produced by isomerization of n-butane, is desirable and of economic importance.

Certain catalysts of the Friedel-Craft type, such as, in particular, the aluminum halides, are known to exert a strong catalytic influence on hydrocarbon reactions. Thus, aluminum chloride, for example, is one of the most powerful cracking and polymerizing catalysts known and is widely used in the cracking of heavy petroleum stocks into gasoline and the polymerization of olefins to synthetic lubricating oils. These catalysts, besides tending to catalyze the rupture of C—C and C—H bonds, when used under certain conditions also tend to catalyze the insomerization of hydrocarbons when such isomerization is thermodynamically favorable. Thus, for example, it has long been known that certain saturated aliphatic hydrocarbons, such as n-heptane and n-octane, when heated under certain conditions in the presence of aluminum chloride, are isomerized to an appreciable extent to branched chain isomers. In the case of the lower homologues, however, and especially in the case of the butanes, the energy difference between the isomers is very small and the isomerization is very slow. Thus, for example, it has been determined that when treating pure normal butane under three atmospheres pressure at room temperature in the presence of 5 mol % aluminum bromide, a period of over two months is required for the isomerization reaction to reach equilibrium.

At higher temperatures the rate of isomerization is more favorable. At higher temperatures, however, the rate of side reactions, such as cracking, is greatly increased and, this, largely offsets the advantages of the increased temperature. Thus, for example, in Ind. Eng. Chem. 28 461 (1936) it is shown that when treating normal butane in the presence of aluminum chloride, no appreciable isomerization takes place below about 100° C. while at 175° the normal butane is mostly decomposed and the product contains only 17% of isobutane.

Another means of increasing the activity of the catalyst and hence the rate of isomerization is by the use of certain promoting substances. It is known, for example, that the catalytic activity of aluminum halides is greatly increased by the presence of a hydrogen halide. Thus, it is found that the rate of isomerization of hydrocarbons generally is increased appreciably by the presence presence of an appreciable amount of free hydrogen halide. The effect of the presence of HCl in the isomerization of hydrocarbons is illustrated, for example, in the following table showing the results of comparative experiments on the isomerization of normal pentane in the presence of 10% by weight of aluminum chloride at 20° C. for 17 hours:

Table I

| Partial pressure of HCl in atmospheres | Isoparaffin in the reaction product |
|---|---|
| | Percent |
| 1.5 | 11 |
| 3.5 | 20 |
| 5.5 | 54 |
| 7.5 | 66 |
| 10.5 | 92 |

The hydrogen halides, however, likewise have a tendency to increase the amount of decomposition and when the isomerization is executed at a practical rate at moderately elevated temperatures, the effect of the larger amounts of hydrogen halide is detrimental rather than advantageous.

An object of the invention is to provide a more practical and economical process for the production of isobutane by the catalytic isomerization of normal butane. A more particular object is to provide a process whereby normal butane may be isomerized to isobutane at a practical rate with a minimum formation of undesirable products due to side reactions. Another object of the invention is to provide a process for the catalytic isomerization of normal butane to isobutane wherein the active life of the catalyst is materially increased.

These objects, I have found, may be realized by executing the catalytic isomerization reaction in the presence of a metal. I have found that when certain metals, such as aluminum, magnesium, calcium or zinc, are present during the execution of the isomerization reaction, they exert a certain catalytic action tending to inhibit the undesirable side reactions.

Since normal butane is, generally speaking, a very unreactive material and the isomerization reaction is normally very slow, I prefer, in general, to effect the isomerization in the presence of the most active isomerization catalysts such as the aluminum halides and, in particular, aluminum chloride or aluminum bromide.

The catalysts are preferably employed in the solid state in any suitable form such as granules, powder, or pellets of the desired size, preferably deposited on or mixed with a suitable solid supporting or carrying material. Particularly effective catalysts are produced when the metal halide catalyst is supported on or intimately mixed with one of the various silica and/or alumina materials of natural or synthetic origin which contain an appreciable amount of firmly-bound water. Suitable materials of this category are, for example, the natural-occurring minerals and clays such as pipe clay, bauxite, fuller's earth, bentonite, kaolin, Florida earth, meerschaum, infusorial earth, kieselguhr, diatomaceous earth, montmorillonite, the permutites and the like; the various treated clays and clay-like materials such as Tonsil, Celite, Sil-O-Cel, Terrana and the like; and artifically prepared materials such as activated alumina, silica gel, the artificial permutites and the like. These materials are preferably heated in a dry atmosphere at a temperature somewhat higher than that at which they are to be employed, for instance, at about 300° C., until they substantially cease to give off water. Although these materials produce preferred catalysts when combined with the metal halides, other carrier or supporting materials, such as activated charcoal, coke, crushed brick, pumice, porcelain chips and the like may also be used, if desired.

The catalyst in the form of pellets or pieces of any desired shape and size may be packed into a reaction tube, vessel or tower of the desired size and maintained at the desired temperature by suitable heating means while the material to be heated is passed into contact with it. Alternatively, the catalyst may be employed in the form of small granules or a powder suspended in the reaction mixture, preferably with stirring.

While the above-described solid catalysts are preferred, the catalyst may be employed in other forms, if desired. Thus, for example, the metal halide may be simply suspended in or vaporized into the reaction mixture, or it may be employed in the form of a complex double compound with a phenolic, aromatic, or other compound, such, for instance, as the compounds of the types known as "Gustavson's Compounds" (C 1903 II 1113) and the "Ansolvo Acids" (Ann. 455 227–253).

Aluminum bromide may be employed in any of these various ways, or may, if desired, be employed as a liquid or in solutions in the reaction mixture. The reaction mixture may or may not contain, besides the butanes, varying amounts of solvents, inert diluents, fixed gases and the like.

Although the aluminum halides are, in general, the most practical and preferred catalysts, such other acid-acting halide catalysts as exert a catalytic influence on the isomerization of hydrocarbons, e. g. the halides of Be, Zn, Zr, Nb, Ta, As, Sb, B, Cd, Fe, may also, if desired, be employed. In general, the catalyst is employed in an amount equal to from about 1 to 20% by weight of the normal butane being treated although larger or smaller amounts can be used.

The process of the present invention is always executed in the presence of at least a small amount of free hydrogen halide. An important feature of the invention is, however, that the beneficial effect of larger amounts of hydrogen halide can be utilized according to the present process while the decomposition reactions are effectively inhibited. In the preferred embodiment of my invention I, therefore, employ a substantial amount of a hydrogen halide such, for example, as a partial pressure of hydrogen chloride or hydrogen bromide of at least one atmosphere measured at 20° C. and, more preferably, from about three to about twenty atmospheres. The hydrogen halide is, preferably, added directly in any convenient manner, as a liquid, gas, or solution. The desired hydrogen halide may, however, be generated in the reaction zone, if desired, by introducing a material which will decompose or react under the prevailing conditions to form the desired hydrogen halide. Suitable materials which may be added for this purpose, are, for example, chlorine, bromine, water, organic halides such as tertiary alkyl halides, organic hydroxy compounds such as the various phenols and alcohols, inorganic salts containing molecular-bound hydrogen halide such as $PbSO_4.2HCl$, $CuSO_4.2HCl$, and the like. When operating in the vapor phase, the butane to be treated may, for example, be bubbled through tertiary butyl chloride or other volatile readily decomposable halide prior to its passage into the reaction chamber.

The catalytic isomerization, according to the process of the present invention, is executed in the presence of a metal. Metals which most effectively inhibit the decomposition and degradation reactions in the present process are beryllium, magnesium, calcium, zinc, copper, iron, silver, and especially aluminum. While these metals are preferred, in general all metals which are capable of reacting with a portion of the hydrogen halide present under the reaction conditions tend to be effective to certain various extents, and may be employed. The metal employed need not necessarily be pure but may, if desired, be an alloy of one or more effective metals. For example, alloys of zinc and aluminum are very effective. The metals are preferably employed in a state offering a large surface such as, for instance, in the form of turnings, shavings, filings, flakes or powder. If the metal is coated with a resistant coating of oxide or the like, the coating is preferably removed to allow access of the free hydrogen halide to the metal. $Fe_2O_3$ powder, for example, does not exert the desired catalytic action. In many cases it is advantageous to activate the surface of the metal prior or during use. This may be done by treating it prior to use with a solution of a salt of a less electropositive metal such as Hg, Cu, U, etc., or in some cases by contacting it with a small amount of mercury.

The metal is preferably employed in intimate admixture with the isomerization catalyst, since the effectiveness is to some extent dependent upon the intimacy of the mixture. Thus, the metal in the form of a powder may be mixed with the isomerization catalyst and the carrier material prior to forming the mixture, for example, by pressing into pellets or other suitably shaped pieces. The metal may also, if desired, be incorporated in the catalyst bed or suspended in the reaction mixture if the operation is executed in the liquid phase. The amount of metal required to produce the optimum results depends upon the particular metal used, the fineness of subdivision of the metal, the activation of the metal surface, if any, the amount of hydrogen halide and/or isomerization catalyst employed, and also upon the temperature at which the reaction is executed. Generally speaking, the amount of metal preferably used is greater the higher the temperature employed and the larger the amount of hydrogen halide and/or isomerization catalyst used. If insufficient metal is employed the decomposition and other side reactions will not be most effectively inhibited. Large, excessive amounts of the metal effectively inhibit the side reactions but also tend to inhibit the isomerization to an appreciable extent. The amount of metal preferably employed for any given set of conditions may be easily determined in practice by adding increments of the metal until the decomposition reactions are inhibited to the desired extent. As will be apparent, the metal will react to a greater or less extent with the hydrogen halide present under the reaction conditions to form metal halides which, especially if the metal employed is aluminum, may also exert a catalytic influence. Care should be taken, therefore, that sufficient metal is added so that there is always free metal in the reaction zone. If aluminum is employed as the metal and if the hydrogen halide concentration is properly adjusted, it is possible to generate sufficient aluminum halide in the reaction zone by this reaction to effect the isomerization without the addition of further quantities of aluminum halide. While this is possible, the results are, in general, not as good as when operating in the presence of added catalyst.

If it is attempted to isomerize normal butane with an aluminum halide catalyst at elevated temperatures in the presence of a hydrogen halide, but without the presence of an inhibiting metal, it is found that at low temperatures the isomerization takes place very slowly without appreciable decomposition or other side reactions. As the temperature is increased, the isomerization takes place at a faster rate but is rapidly overtaken by decomposition reactions. It is found that when executing the isomerization in accordance with the process of the present invention in the presence of a suitable metal, the decomposition reactions may be effectively inhibited so that much higher temperatures affording more favorable isomerization velocities may be economically employed. By the use of a sufficient quantity of a suitable metal, according to the present process, the decomposition reaction may be inhibited up to temperatures of about 250°–300° C. Since, however, under these strongly inhibited conditions the isomerization itself is less than can be obtained at somewhat lower temperatures, it is more advantageous to execute the reaction at temperatures below about 200° C. When the process is executed with the treated normal butane in the vapor phase the best conversions to isobutane with substantially no decomposition are, in general, obtained when operating at temperatures from about 70° C. to about 200° C. When the process is executed in the liquid phase, temperatures from about 30° C. to about 150° C. are preferred.

The present process may be executed at any pressure from about one atmosphere up to as high as desired. Since the process is, however, usually executed in the presence of at least one atmosphere pressure, and, preferably, between about three and twenty atmospheres pressure of a hydrogen halide (measured at 20° C.), the pressure usually exceeds three atmospheres and is often in the neighborhood of 5–50 atmospheres. The desired pressure may, if desired, be produced by introducing a gas, such as $H_2$, $N_2$, $CO_2$, or the like.

When operating in the liquid phase, the reaction may be conveniently executed in a suitable continuous reactor of the autoclave type, preferably equipped with suitable heating and cooling means and means for agitating the reaction mixture, or the liquid reaction mixture may be circulated under suitable superatmospheric pressure through a chamber, reactor, or tower containing the catalyst and maintained at the desired temperature. When executing the reaction in the vapor phase, the catalyst is preferably employed supported on a suitable carrier material, such as described above, and the vapors containing the normal butane passed through a bed of the catalyst maintained at the desired temperature. The lowest temperature at which it is possible to effect the reaction in the vapor phase depends upon the pressure applied. Thus, for example, at a pressure of about ten atmospheres, this lowest temperature is about 70° C., when the material treated is substantially pure butane.

The invention provides a practical process for converting to isobutane the normal butane content of commercial hydrocarbon mixtures such as are obtained from the cracking of higher molecular weight hydrocarbons and hydrocarbon mixtures such as petroleum oils, shale oils, petroleum products, animal and vegetable oils, coal, peat, waxes, etc. Conveniently treated normal butane-containing mixtures are the so-called butane-butene fractions from which the olefines have been substantially removed. Treatment of such mixtures which contain a certain amount of isobutane, results in very materially increasing their isobutane content and enhancing their value as raw materials in the production of isobutene, etc. Technical butane fractions, such as those containing from 80% to 98% normal butane and from about 20% to 2% isobutane, may be treated in accordance with the process of the invention and their isobutane content increased to 60% or more without appreciable loss of butanes due to decomposition and while realizing a maximum active life of the catalyst employed. Other mixtures containing normal butane are also applicable. For example, a mixture comprising, besides a substantial amount of normal butane, one or a plurality of other hydrocarbons, such as methane, ethane, propane, etc., which may or may not be capable of isomerization under the reaction conditions, may be employed. Furthermore, materials comprising normal butane and a substantially inert material such as $N_2$, $CO$, $CO_2$ either with or without other hydrocarbon vapors may be employed.

The material treated is, however, preferably substantially free of materials which are polymerized by the isomerization catalyst under the reaction conditions. This is of considerable importance when the normal butane is to be isomerized in the vapor phase. Olefins, when present to any appreciable extent in the normal butane to be treated, tend to materially shorten the life of the catalyst. According to a preferred embodiment of the invention any olefin or other detrimental impurities in the charge stock are removed prior to use by a suitable treatment, such as with strong sulfuric acid or a pre-treatment with a portion of the spent catalyst from the present process. In many cases the life of the isomerization catalyst is materially increased if the charge stock is given a hydrogenation treatment prior to use, even though upon analysis it appears to be substantially free of olefins.

Since the isomerization reaction of normal butane to isobutane tends to establish an equilibrium mixture, the reaction product obtained in the present process is generally a mixture consisting of normal butane, isobutane, hydrogen halide etc., in which the isobutane content may vary from a few per cent up to about 70%, depending upon the temperature, pressure, reaction time employed, the activity of the catalyst, etc. If desired, the isobutane can often be continuously removed substantially pure from the reaction system by fractional distillation while the unconverted normal butane remains until it isomerizes. Likewise, the reaction product may be discharged into a suitable still wherein the isobutane is separated by fractional distillation and the normal butane returned to the reactor. The reaction product after removing any hydrogen halide, catalyst, metal etc., which may be contained therein, may be used per se in a subsequent process such as in a sulfuric acid alkylation process, catalytic dehydrogenation process or the like. Any hydrogen halide removed from the reaction zone with the product is preferably separated by any conventional method and returned to the system.

An important advantage of the invention is that in the presence of even small amounts of the metals employed, the aluminum halide catalysts undergo much less alteration during the treatment and remain active for a long time. When aluminum halides are employed alone, they are very soon converted into an oily mass and become inactive.

The following examples illustrate suitable applications and aspects of the process of the invention and the advantageous results obtainable thereby.

Example I 100 grams of normal butane, 30 grams of aluminum chloride and 2 grams of magnesium powder were charged to a one liter V2A steel autoclave and 10 grams of hydrogen chloride introduced. After reacting the mixture for four hours at 120° C. while stirring, the product was removed and the aluminum chloride, remaining magnesium and hydrogen chloride separated. The hydrocarbon product was found to contain:

| | Per cent |
|---|---|
| Isobutane | 60.4 |
| Normal butane | 34.5 |
| Decomposition and polymerization products | 5.1 |

If the magnesium is not employed, about three-quarters of the butane is decomposed.

Example II

The experiment of Example I was repeated under identical conditions except that a large amount of magnesium powder (10 grams) was employed. The hydrocarbon product was found to contain:

| | Per cent |
|---|---|
| Isobutane | 25.3 |
| Normal butane | 74.7 |
| Decomposition products | 0.0 |

Example III

The experiment of Example I was again repeated under identical conditions except that 5 grams of silver were employed instead of the magnesium powder. The hydrocarbon product was found to contain:

| | Per cent |
|---|---|
| Isobutane | 56.6 |
| Normal butane | 37.3 |
| Decomposition and polymerization products | 6.1 |

Example IV

A series of experiments was made in which 80 grams of normal butane were treated in the presence of 40 grams of aluminum chloride and varying amounts of aluminum metal at 120° C. under a pressure of about four atmospheres of hydrogen chloride (measured at 20° C.). The various mixtures were reacted for four hours while stirring in a one liter V2A steel autoclave. The percentages of isobutane and decomposition and polymerization products found in the reaction products, corresponding to various amounts of aluminum employed are shown in the following table:

*Table II*

| Grams aluminum employed | Isobutane | Decomposition and polymerization products |
|---|---|---|
| | Percent | Percent |
| 0 | 7.4 | 82 |
| 1 | 19.1 | 59 |
| 1.2 | 31.7 | 38 |
| 1.6 | 50.4 | 8 |
| 4 | 4.0 | 0 |

If the temperature, amount of aluminum chloride, and/or the partial pressure of hydrogen chloride employed is varied, the amount of aluminum metal required to produce the optimum yield of isobutane with the least decomposition and polymerization varies considerably.

Example V

A commercial butane fraction containing 90% normal butane and 10% isobutane was passed as a vapor at a rate of 100 grams per hour along with 5 grams per hour of hydrogen chloride through a catalyst bed of volume 250 c. c. at a temperature of 100° C. and 10 atmospheres pressure. The catalyst was prepared by forming pellets from a mixture of 107 grams of aluminum powder and 243 grams of aluminum chloride. At the end of 15 hours of continuous operation, the isobutane content of the exit once-through product was 67% and no appreciable cracking was observed.

Example VI

The same commercial butane fraction as was used in the experiment of Example V was passed with hydrogen chloride under the same conditions over a catalyst consisting of pellets prepared from a mixture of 194 grams of aluminum chloride, 10 grams of aluminum powder and 84 grams of dried pipe clay. After over 200 hours of operation, the isobutane content of the exit once-through product still averaged about 50% and no appreciable cracking was observed.

EXAMPLE VII 80 grams of a commercial butane fraction, containing about 96% normal butane, 4% isobutane and a trace of pentane, were charged with 8 grams of hydrogen chloride into a one liter V₂A steel autoclave containing 40 grams of aluminum chloride and 2 grams of aluminum powder, and the mixture reacted for four hours at 120° C. This amount of aluminum metal was not quite sufficient to produce the optimum results under these conditions. The product contained 39% isobutane and a considerable amount of decomposition products. Upon treating a second portion of 80 grams of the butane and 8 grams hydrogen chloride with this same catalyst, the small amount of aluminum metal remaining was consumed. The isobutane content of the product, therefore, dropped to 20.3% and the decomposition was considerably increased. Upon repeating the experiment, using an excess (6 grams) of aluminum metal, the reaction product was found to contain 16.9% isobutane and substantially no decomposition products. Upon treating a second portion of 80 grams of the butane and 8 grams hydrogen chloride with this same catalyst, the excess aluminum metal was reduced by reaction to a more nearly optimum quantity. The isobutane content of the product, therefore, increased to 58.7% while the decomposition increased slightly to about 7.6%. By adding the necessary quantity of aluminum metal with each succeeding charge of butane and hydrogen chloride, this original catalyst could be repeatedly used without appreciable deterioration.

EXAMPLE VIII

Four grams of aluminum powder were charged to a one liter V₂A steel autoclave and heated for 20 hours at 120° C. under a pressure of 20 atmospheres of hydrogen chloride, in order to partially convert it into aluminum chloride. 80 grams of 96% normal butane were then introduced into the autoclave and the mixture reacted at 120° C. for four hours. The reaction product contained 60.1% isobutane and less than 5% decomposition products.

EXAMPLE IX

Eighty gram portions of a butane fraction containing 96% normal butane and 4% isobutane were treated at 120° C. for four hours in a one liter V₂A steel autoclave in the presence of 40 grams of aluminum chloride, 8 grams hydrogen chloride and 20 grams of various metals. The percentages of decomposition plus polymerization products and isobutane found in the hydrocarbon reaction products are shown in the following table:

Table III

| Metal employed | Decomposition products | Isobutane |
| --- | --- | --- |
|  | Percent | Percent |
| None | 48.6 | 30.5 |
| Cu | 0.4 | 39.5 |
| Zn | 0.4 | 33.8 |
| Fe | 4.6 | 57.2 |

By employing less metal much better results could be obtained.

The above examples, which illustrate various aspects of the invention, are not to be considered as limiting the invention. It is to be understood that modifications will be readily apparent to those skilled in the art and that no limitations are intended other than those imposed by the scope of the appended claims.

I claim as my invention:

1. In a process for the production of isobutane by the catalytic isomerization of normal butane wherein the isomerization is effected by contacting normal butane with an aluminum halide isomerization catalyst and a hydrogen halide promoter under isomerization conditions to effect the isomerization of normal butane as the predominant reaction, the improvement which comprises effecting the isomerization reaction in the presence of an aluminum halide catalyst containing a metal which reacts with a portion of the hydrogen halide promoter, whereby undesirable side reactions are repressed.

2. In a process for the production of isobutane by the catalytic isomerization of normal butane wherein the isomerization is effected by contacting normal butane with an aluminum chloride isomerization catalyst and hydrogen chloride promoter under isomerization conditions to effect the isomerization of normal butane as the predominant reaction, the improvement which comprises effecting the isomerization reaction in the presence of an aluminum chloride catalyst containing a metal which reacts with a portion of the hydrogen chloride promoter, whereby undesirable side reactions are repressed.

3. In a process for the production of isobutane by the catalytic isomerization of normal butane wherein the isomerization is effected by contacting normal butane with a Friedel-Crafts type isomerization catalyst and a hydrogen halide promoter under isomerization conditions to effect the isomerization of normal butane as the predominant reaction, the improvement which comprises effecting the isomerization reaction in the presence of a Friedel-Crafts type isomerization catalyst containing a metal which reacts with a portion of the hydrogen halide promoter, whereby undesirable side reactions are repressed.

4. In a process for the production of isobutane by the catalytic isomerization of normal butane wherein the isomerization is effected by contacting normal butane with an aluminum halide isomerization catalyst and sufficient hydrogen halide promoter to exert a partial pressure of at least one atmosphere at 20° C. under isomerization conditions to effect the isomerization of normal butane as the predominant reaction, the improvement which comprises effecting the isomerization reaction in the presence of an aluminum halide catalyst containing a metal which reacts with a portion of the hydrogen halide promoter, whereby undesirable side reactions are repressed.

5. In a process for the production of isobutane by the catalytic isomerization of normal butane wherein the isomerization is effected by contacting normal butane with an aluminum halide isomerization catalyst and sufficient hydrogen halide promoter to exert a partial pressure of between three and twenty atmospheres at 20° C. under isomerization conditions to effect the isomerization of normal butane as the predominant reaction, the improvement which comprises effecting the isomerization reaction in the presence of an aluminum halide catalyst containing a metal which reacts with a portion of the hydrogen halide promoter, whereby undesirable side reactions are repressed.

6. In a process for the production of isobutane by the catalytic isomerization of normal butane wherein the isomerization is effected by contacting normal butane with an aluminum halide isomerization catalyst and a hydrogen halide promoter under isomerization conditions to effect the isomerization of normal butane as the predominant reaction, the improvement which comprises effecting the isomerization reaction in the presence of an aluminum halide catalyst containing sufficient metallic aluminum to react with a portion of the hydrogen halide promoter, whereby undesirable side reactions are repressed.

7. In a process for the production of isobutane by the catalytic isomerization of normal butane wherein the isomerization is effected by contacting normal butane with an aluminum halide isomerization catalyst and a hydrogen halide promoter under isomerization conditions to effect the isomerization of normal butane as the predominant reaction, the improvement which comprises effecting the isomerization reaction in the presence of an aluminum halide catalyst containing sufficient metallic zinc to react with a portion of the hydrogen halide promoter, whereby undesirable side reactions are repressed.

8. In a process for the production of isobutane by the catalytic isomerization of normal butane wherein the isomerization is effected by contacting normal butane with an aluminum halide isomerization catalyst and a hydrogen halide promoter under isomerization conditions to effect the isomerization of normal butane as the predominant reaction, the improvement which comprises effecting the isomerization reaction in the presence of an aluminum halide catalyst containing sufficient metallic iron to react with a portion of the hydrogen halide promoter, whereby undesirable side reactions are repressed.

GEORGE CORNELIS ADRIAAN SCHUIT.